(12) United States Patent
Garcia

(10) Patent No.: US 8,439,590 B2
(45) Date of Patent: May 14, 2013

(54) KNUCKLE PROTECTOR FOR A VEHICLE

(75) Inventor: Florent Garcia, Lans en Vercors (FR)

(73) Assignee: A. Raymond et Cie, Grenoble (FR)

( * ) Notice: Subject to any disclaimer, the term of this patent is extended or adjusted under 35 U.S.C. 154(b) by 62 days.

(21) Appl. No.: 12/999,477

(22) PCT Filed: Aug. 26, 2009

(86) PCT No.: PCT/EP2009/006172
§ 371 (c)(1),
(2), (4) Date: Dec. 16, 2010

(87) PCT Pub. No.: WO2010/025866
PCT Pub. Date: Mar. 11, 2010

(65) Prior Publication Data
US 2011/0262211 A1    Oct. 27, 2011

(30) Foreign Application Priority Data
Sep. 2, 2008 (FR) ...................... 08 55861

(51) Int. Cl.
*F16C 11/06* (2006.01)
(52) U.S. Cl.
USPC .................. 403/149; 403/23; 280/93.512
(58) Field of Classification Search ............ 403/11, 403/12, 122, 149, 364, 23; 280/93.511, 93.512; 248/300
See application file for complete search history.

(56) References Cited

U.S. PATENT DOCUMENTS

| | | | | |
|---|---|---|---|---|
| 2,243,222 A * | 5/1941 | Rebholz | ........................ | 248/300 |
| 2,483,621 A * | 10/1949 | Burnett | .................... | 280/93.511 |
| 2,657,945 A * | 11/1953 | Britt | ........................ | 280/93.511 |
| 2,888,148 A * | 5/1959 | Meyers | ........................ | 248/300 |
| 3,326,503 A * | 6/1967 | Bade | ........................ | 248/672 |
| 3,742,552 A * | 7/1973 | Balchunas | ..................... | 16/42 R |
| 5,203,522 A * | 4/1993 | White et al. | ................. | 244/17.11 |
| 5,538,275 A * | 7/1996 | Lomnick | ................. | 280/93.511 |
| 6,095,712 A * | 8/2000 | Ridley et al. | ..................... | 403/23 |
| 6,520,708 B1* | 2/2003 | Jung et al. | ..................... | 403/364 |
| 6,935,803 B2* | 8/2005 | Abels et al. | ..................... | 403/122 |
| 7,810,770 B2* | 10/2010 | Treadwell | ..................... | 248/300 |
| 2005/0152738 A1 | 7/2005 | Abels et al. | | |

FOREIGN PATENT DOCUMENTS

| | | | |
|---|---|---|---|
| EP | 0570736 A1 | 11/1993 | |
| EP | 0658469 A1 | 6/1995 | |
| EP | 1653094 A1 | 3/2006 | |
| JP | 62-172180 | * 10/1987 | |

OTHER PUBLICATIONS

Written Opinion and International Search Report mailed Dec. 7, 2009 in parent application No. PCT/EP2009/006172.

* cited by examiner

*Primary Examiner* — Michael P Ferguson
(74) *Attorney, Agent, or Firm* — Faegre Baker Daniels LLP

(57) ABSTRACT

The invention relates to a protection device (1) for a knuckle joint (21) e.g. for the steering and/or suspension of a vehicle, which comprises an annular flange (2) for securing a thermal screen (3) to the knuckle joint, said screen extending lengthwise substantially perpendicular to the flange (2) and widthwise substantially along the annular periphery of the flange. The screen and the flange are formed as a single part in a metal sheet that is folded in a linking area between the screen and the flange, the screen further including a surface portion in the form of a side tab (6) extending along the annular periphery of the flange, said side tab being separated from the flange by a notch (12) in the metal sheet, in the form of a slot.

10 Claims, 2 Drawing Sheets

KNUCKLE PROTECTOR FOR A VEHICLE

CROSS-REFERENCE TO RELATED APPLICATION

This application is a U.S. National Phase Patent Application based on International Application Serial No. PCT/EP2009/006172 filed Aug. 26, 2009, the disclosure of which is hereby explicitly incorporated by reference herein.

BACKGROUND OF THE INVENTION

1. Field of the Invention

The present invention relates to a device for protecting a knuckle joint, which is for instance an element of the front steering or the suspension of a vehicle.

In the domain of automotive engineering, this type of knuckle joint, also called knuckle, is mounted on the ball joint pin of the suspension arm or on the ball joint pin of the steering rack. In both cases, the knuckle is very close to the brake disc, which is a significant heat source. For instance, the brake disc of a loaded utility vehicle can reach a temperature of up to 700° C.

A knuckle comprises mainly a knuckle articulation which is crimped to create the articulation and a boot in elastomeric rubber enveloping the assembly to protect it against dust.

The disadvantage of this type of knuckle is that the material used for the boot is very sensitive to high temperature and the proximity of the brake disc causes great damage to this boot.

In view of this, it is essential to protect the knuckle joint against high temperature. In current practice, this problem is solved by using a large plate installed between the brake disc and the knuckle in order to protect a large surface of the knuckle. However, this solution remains costly in terms of material to be supplied.

2. Description of the Related Art

Document EP0890500 discloses a protection device for the knuckle joint of a vehicle comprising an annular flange mounted on the knuckle, a heat screen which extends in height perpendicularly to the flange and in width along the annular periphery of the flange. Flange and screen are formed in one piece in a deep draw stamping operation starting from sheet metal. This operation is most often performed in several passes, in other words in several stamping operations. The process is not only long but also costly in energy, handling and stamping tooling.

SUMMARY OF THE INVENTION

The present invention provides a device for protecting the knuckle joint of a vehicle that is simple to fabricate and less costly, and is resistant to deformation in order not to damage the nearby steering and suspension elements.

To this end, the present invention provides a knuckle joint protection device for instance for the steering or the suspension of a vehicle, comprising an annular flange mounted on the knuckle joint and a heat screen, this screen extends in height perpendicularly to the flange and in width along the annular periphery of the flange, characterized in that screen and flange are formed in one piece from sheet metal bent in a connecting zone between screen and flange; furthermore part of the surface of the screen is in the form of a side wing which extends along the annular periphery of the flange, this side wing is separated from the flange by a notch in the form of a slot.

This arrangement contributes to obtaining a protection device that can be fabricated mainly by bending sheet metal, because the length of the connecting zone between screen and flange is not excessive. It is clear that this notch in the form of a slot, separating the side wing from the flange, leads to the creation of a large protection surface with a sufficiently small connecting zone in order to form the device by bending. Contrary to a deep draw stamping operation, bending is a simple, inexpensive and fast operation, which can be performed by a conventional machine tool.

On the other hand, satisfactory resistance to deformation of the screen with one or two side wings, for instance under the influence of vehicle vibrations, is obtained very simply by means of a blocking feature which is easy to fabricate by cutting and bending the sheet metal at each side wing and flange.

The protection device according to the invention can have the following features:
- the blocking feature is formed by two tabs cut and bent in the flange in order to pinch the lower edge of a wing;
- the blocking feature consists of a tab formed in the sheet metal of the wing and a hole punched in the flange;
- reinforcement ribs on each side wing;
- each side wing has a width equal to half said connection zone between screen and flange;
- the flange comprises a centering collar surrounding the annular opening of the flange.

In one form thereof, the present invention provides a protection device for knuckle joint for instance of the steering and/or suspension of a vehicle, including an annular flange mounting to the knuckle joint and a heat screen, this screen extends in height perpendicularly to the flange and in width along the annular periphery of the flange, characterized in that the screen and the flange are formed in one piece of sheet metal which is bent in a connecting zone between the screen and the flange, the screen has moreover a surface part in the form of a side wing which extends along the periphery of the annular flange, this side wing is separated from the flange in the sheet metal by a notch in the form of a slot.

A specific example of a first and second implementation mode of a protection device according to the invention is described below in more detail and illustrated by the drawings. This description is given only as a non-limiting example of the invention.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
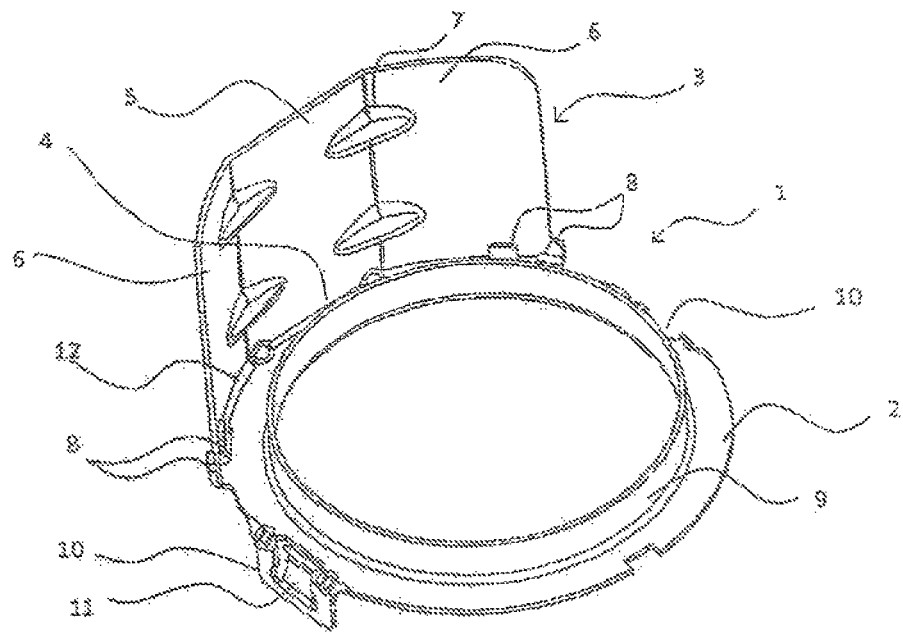
FIG. 1 illustrates the protection device according to a first implementation mode of the invention.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 shows a protection device 1 for knuckle joint (illustrated in FIGS. 2a and 2b) of a vehicle comprising mainly an annular flange 2 mounted on the knuckle joint, here in the form of a disc with a central opening, and a heat screen 3 for protecting against the heat emitted by the brake discs. Screen 3 extends in height perpendicularly to flange 2 and in width along the annular periphery of the flange.

The central opening of the mounting flange 2 has a circular shape mating with the also circular external contour of the knuckle, over which it passes for installation of the protection device. For instance, the inside diameter of the opening measures 44 m and the external diameter of the annular flange 2 measures 55 mm.

The heat screen has a rectangular shape and its dimensions are sufficient to protect the whole surface of the rubber boot of the knuckle, deflecting the heat effects and creating an air zone. For instance, the size of the screen can be 57 mm wide and 28 mm high.

The screen extends along the outside periphery of the annular mounting flange 2. It is connected to flange 2 along a bent connection or a connection zone 4 constituting a central part 5 of the longitudinal edge of screen 3. This connection zone 4 defines the central body 5 of screen 3 which extends radially starting from the connection zone 4.

The heat screen 3 comprises furthermore one or two side wings 6 arranged on both sides of central body 5. The side wings extend along the annular periphery of flange 2. According to the invention, they are separated from flange 2 by a notch in the form of a slot 12. The side wings 6 are detached from flange 2, in other words they are only connected to flange 2 through the intermediary of central body 5 and a space is left free between the wings and the outside periphery of flange 2. It is clear that this notch 12 in the form of a slot leads to the creation of a sufficiently wide screen to protect the knuckle and a sufficiently short connecting zone 4 to bend the screen relative to flange 2 in a perpendicular arrangement. By preference, the side wings 6 extend beyond the central body 5 over a distance at least equivalent to approximately half the width of said central body. For instance, central body 5 and side wings 6 measure 19 mm by 28 mm.

Mounting flange 2 and screen 3 are made in a single piece, in other words by cutting one piece of plate or sheet metal, with thickness for instance between 0.5 and 2 mm.

The protection device 1 is then formed by simple bending of screen 3 relative to the mounting flange 2 so that they are perpendicular to each other. The side wings are bent down to follow, with the central body, the outside periphery of the mounting flange 2.

The protection device 1, illustrated in FIG. 1 in formed configuration, was made by cutting and bending operations. Next, reinforcement ribs 7 are obtained by a deformation operation of the junction between the central body 5 and the side wings 6. By preference, this operation is performed when the screen is in formed configuration. In particular, the ribs 7 extend along the width of screen 3 forming protuberances in the inside part of the formed screen and ribs on the outside. This arrangement reinforces the rigidity of the screen running along the periphery of flange 2.

According to the invention, during the initial stage of sheet metal cutting, protuberances are formed in the shape of blocking tabs or tenons 8 extending radially starting from the outside periphery of the mounting disc 2. Tenons 8 are subsequently bent to be perpendicular to flange 2 in the same manner as screen 3. Advantageously, the blocking tabs are positioned at the periphery of the mounting flange 2 so as to face the extremities of side wings 6 when the protection device 1 is formed. By preference, at least one pair of blocking tabs is provided facing the extremity of each side wing 6. The tabs of one pair are offset on the outside periphery of disc 2 to define a radial space between them corresponding to the thickness of the side wing. Consequently, arranged in this way, tabs 8 pinch the lower edge of the wing, blocking the wing along the annular periphery of the flange.

During the bending of side wings 6, the side wings are respectively inserted in the space defined between each pair of blocking tabs, which constitutes an effective means of blocking. With such arrangement, the extremities of side wings 6 are blocked in radial direction of the annular disc 2. It is clear that a blocking tab of each pair blocks the radial displacement of the corresponding wing towards the inside of disc 2 while the other tab of the same pair blocks its displacement towards the outside of disc 2. In this way, all movement of side wings 6 and all deformation of protection device 1 is prevented.

Furthermore, the mounting disc 2 comprises a centering collar 9, for insertion of the knuckle in the central opening, and at least two tabs 10 for mounting the protection device on the knuckle.

The centering collar 9 is of cylindrical shape and extends in coaxial manner starting from the inside edge of the annular flange 2 in the bending direction of screen 3. The height of the centering collar 9 is approximately ten times smaller than its diameter, or approximately equal to 5 mm. The centering collar 9 is made in a simple one step stamping operation in an inexpensive machine. It is clear that the centering collar 9 must be made in such manner during the cutting operation of the sheet metal that the central opening of the annular flange corresponds to the knuckle joint.

The mounting tabs 10 are protuberances in the form of teeth extending axially starting from the outside periphery of the mounting flange 2 in the opposite direction of centering collar 9. The two mounting tabs 10 are arranged diametrically opposite to each other on the outside periphery of flange 2 with central body 5 of screen 3 situated in a median plane to the two tabs 10.

The mounting tabs 10 are made during the cutting step of the sheet metal and form radial protuberances which are then bent in axial direction in the opposite direction of the bending of screen 3.

Each mounting tab has a rectangular shape with one side tangential to the outside periphery of flange 2. In a supplementary cutting step a "U" shape is cut in each tab 10 forming a flexible tongue 11 attached to the extremity of tab 10. The tongue 11 is then deformed to achieve an "S" shaped section. Consequently, the flexible tongue 11 is shorter than the mounting tab 10 and rounded towards the inside of flange 2 for passage and insertion in the washer of the knuckle as illustrated in FIGS. 2a and 2b.

Figure 2A:
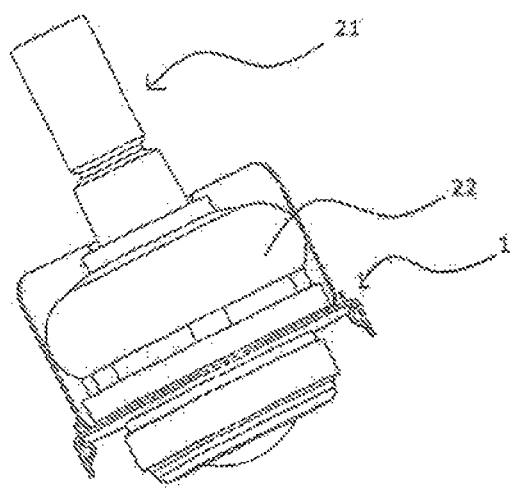
FIGS. 2a and 2b show the protection device in installed position on a knuckle joint.
Figure 2B:
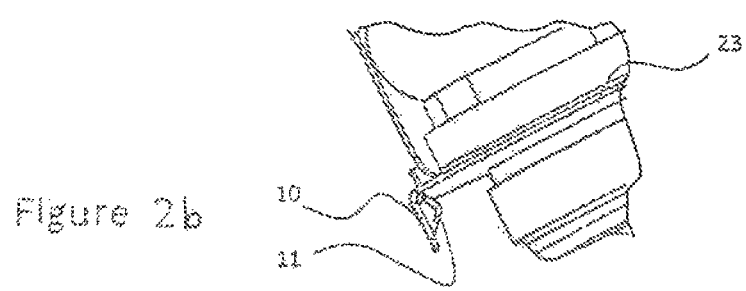

FIGS. 2a and 2b show a knuckle joint 21 of a vehicle equipped with the protection device 1 according to the invention.

The installed heat screen 3 performs the function of heat barrier around boot 22. The knuckle joint is in this way protected against heating of the brake disc.

During the installation operation, the knuckle joint is inserted in the central opening of the mounting flange 2, the centering collar 9 guiding the spindle of the knuckle.

In final position, centering collar 9 is married to the periphery of the knuckle 21 and the flexible tongues 11 click or snap in washer 23 of the knuckle joint. The mounting flange 2 is then blocked in axial direction by means of mounting tabs 10 which click in washer 23. Any other type of mounting of the protection device on the knuckle can be provided. For instance, the protection device can be mounted by clamping between washer and knuckle.

In this final position, the protection device 1 is mounted on knuckle 21 with screen 3 protecting boot 22.

Figure 3:
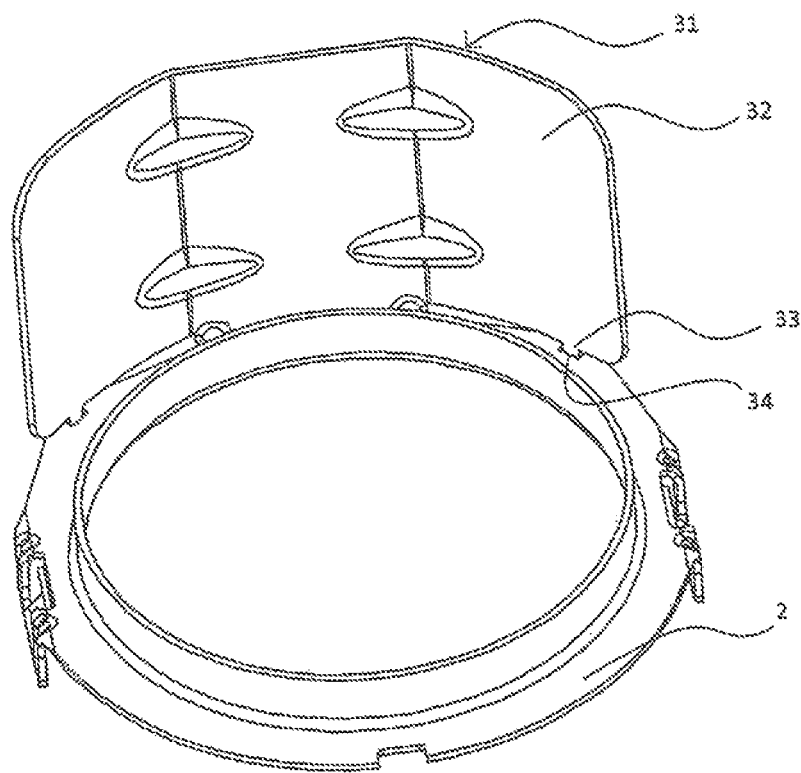
FIG. 3 shows the protection device according to a second implementation mode of the invention.

FIG. 3 shows an alternative mounting of the extremities of the side wings 32.

In this second implementation mode, the protection device according to the invention 31 has side wings 32 provided with blocking tabs or tenons 33 formed in the wing sheet metal cooperating with corresponding holes or openings 34 formed in the outside periphery of the mounting flange 2.

In particular, the blocking tabs 33 extend sideways in direction of the mounting flange 2. They are made during the cutting step in the same manner as the corresponding openings 34.

It is clear that the scope of the invention is not exceeded by modifying the blocking means of the extremities of the side wings or by modifying the mounting tabs of the protection device on the knuckle joint. For instance, according to the invention a combination of blocking means illustrated in FIGS. 1 and 3 can be provided.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A protection device for use with a knuckle joint of a steering or suspension system of a vehicle, the knuckle joint comprising a ball in rotatably mounted within a housing and a sealing boot extending between the housing and a shaft of the ball pin, said protection device comprising:

an annular flange mountable to the knuckle joint;

a heat screen extending in a height direction perpendicularly to said flange and in a width direction along an annular periphery of said flange, wherein said screen and said flange are integrally formed from a single planar piece of metal bent in a connecting zone between said screen and said flange, said screen further including a pair of side wings disposed on opposing sides of a central part of said screen and extending along said annular periphery of said flange, each of said side wings separated from said flange by a circumferential gap formed between a lower edge of each said side wing and a peripheral edge of said flange; and tabs formed on said flange for connecting each said side wing to said annular periphery of said flange, said tabs engaging opposite sides of said lower edge of each said side wing;

said flange includes a central opening having an annular interior edge;

said annular periphery of said flange comprises at least one mounting protuberance integrally formed with said flange and extending from said flange in the opposite direction of said screen; and wherein said flange is mountable on the housing such that the shaft of the ball pin extends through said flange in the direction of said heat screen and said screen at least partially surrounds the sealing boot, and wherein said protuberance is resiliently mountable on a mounting flange of the housing.

2. The device of claim 1, wherein each said side wing is provided with reinforcement ribs.

3. The device of claim 1, wherein each said side wing has a width equal to at least half of the width of said screen.

4. The device of claim 1, wherein said annular interior edge of said flange includes a centering collar, said centering collar is integrally formed with said flange and extends perpendicularly from said annular interior edge of said flange in the same direction as said screen.

5. The device of claim 1, wherein said mounting protuberance has a flexible tongue.

6. A protection device for use with a knuckle joint of a steering or suspension system of a vehicle, the knuckle joint comprising a ball in rotatably mounted within a housing and a sealing boot extending between the housing and a shaft of the ball pin, said protection device comprising:

an annular flange mountable to the knuckle joint;

a heat screen extending in a height direction perpendicularly to said flange and in a width direction along an annular periphery of said flange, wherein said screen and said flange are integrally formed from a single planar piece of metal bent in a connecting zone between said screen and said flange, said screen further including a pair of side wings disposed on opposing sides of a central part of said screen and extending along said annular periphery of said flange, each of said side wings separated from said flange by a circumferential gap formed between a lower edge of each said side wing and a peripheral edge of said flange; and tabs respectively formed on said side wings for connecting each said side wing to said annular periphery of said flange, each said tab received with a hole of said flange;

said flange includes a central opening having an annular interior edge;

said annular periphery of said flange comprises at least one mounting protuberance integrally formed with said flange and extending from said flange in the opposite direction of said screen; and wherein said flange is mountable on the housing such that the shaft of the ball pin extends through said flange in the direction of said heat screen and said screen at least partially surrounds the sealing boot, and wherein said protuberance is resiliently mountable on a mounting flange of the housing.

7. The device of claim 6, wherein each said side wing is provided with reinforcement ribs.

8. The device of claim 6, wherein each said side wing has a width equal to at least half of the width of said screen.

9. The device of claim 6, wherein said annular interior edge of said flange includes a centering collar, said centering collar is integrally formed with said flange and extends perpendicularly from said annular interior edge of said flange in the same direction as said screen.

10. The device of claim 6, wherein said mounting protuberance has a flexible tongue.

* * * * *